(12) United States Patent
Wheeler (10) Patent No.: US 7,327,516 B2
(45) Date of Patent: Feb. 5, 2008

(54) MOBILE SCREEN STORAGE COMPARTMENT (MSSC)

(75) Inventor: LaNae Estelle Wheeler, 14389 Uniform Dr., Centreville, VA (US) 20121

(73) Assignee: LaNae Estelle Wheeler, Centreville, VA (US)

( * ) Notice: Subject to any disclaimer, the term of this patent is extended or adjusted under 35 U.S.C. 154(b) by 149 days.

(21) Appl. No.: 11/012,181

(22) Filed: Dec. 16, 2004

(65) Prior Publication Data

US 2006/0132909 A1 Jun. 22, 2006

(51) Int. Cl.
*G03B 21/30* (2006.01)
*G03B 21/58* (2006.01)
*H04N 5/64* (2006.01)

(52) U.S. Cl. ............... 359/443; 359/461; 353/72; 348/794; 349/58

(58) Field of Classification Search ............. 359/443, 359/446, 460, 444, 450, 461; 40/588, 591, 40/423; 349/16, 58; 353/94, 74, 72; 348/787–789, 348/794; *G03B 21/30, 21/58*
See application file for complete search history.

(56) References Cited

U.S. PATENT DOCUMENTS 3,761,152 A * 9/1973 Cory ......................... 312/7.2
4,110,792 A * 8/1978 Long et al. ................. 348/383
4,556,283 A * 12/1985 Numata et al. ............. 359/443
6,191,886 B1 * 2/2001 Sinkoff ....................... 359/443
6,497,442 B1 * 12/2002 Wacker ..................... 296/24.32
2005/0046315 A1 * 3/2005 Doane et al. ................ 312/196
2005/0248243 A1 * 11/2005 Bober ......................... 312/306

FOREIGN PATENT DOCUMENTS

WO WO2005/109092 A1 * 11/2005

* cited by examiner

*Primary Examiner*—Andrew T Sever (57) ABSTRACT

A mobile screen storage compartment that stores a video display screen and is attached to one side of a truck trailer. The screen is extended, retracted and held in place using hydraulic lift devices and stabilizing devices stored in the compartment along with the display screen. Command and control of storage compartment components are provided by power, computer audio and video equipment stored within the mobile truck trailer. Electric cables connect the storage compartment components to equipment within the mobile truck trailer. The mobile screen storage compartment will allow for delivery of pre-recorded movies and shows or live broadcasts to large outdoors audiences.

10 Claims, 10 Drawing Sheets

MOBILE SCREEN STORAGE COMPARTMENT (MSSC)

CROSS REFERENCE TO RELATED APPLICATIONS

Not Applicable

STATEMENT OF FEDERALLY SPONSORED RESEARCH/DEVELOPMENT

Not Applicable

REFERENCE TO A "SEQUENCE LISTING", A TABLE OR COMPUTER PROGRAM LISTING COMPACT DISK APPENDIX

Not Applicable

BACKGROUND OF THE INVENTION

The intent of the mobile screen storage compartment (MSSC) is to enhance the drive-in movie concept by making major components of the drive-in movie, like the display screen, mobile. With a modified truck trailer that has the mobile screen storage compartment (MSSC) attached, a truck driver can deliver quality entertainment to different locations such as the community center parking lot, a shopping mall parking lot or a public park area. The screen along with the proper audio and video equipment would be configured to broadcast movies, pre-recorded or live televised events to viewers while outdoors.

BRIEF SUMMARY OF THE INVENTION

A mobile screen storage compartment (MSSC) has automatic raising and lowering capability using electric hydraulic components. A truck with a trailer has a display screen compartment attached to one side of the trailer. The screen compartment covers the entire height and width of the trailer on one side. The screen compartment has a lid on the top (roof) and contains hydraulic lifts on the bottom (floor) of the compartment. The hydraulic lifts raise and lower the screen into position. There are shock support cups on each hydraulic lift to hold the display screen in place and stabilize it while it is extended. Once the screen is extended, display screen roof supports attached to the roof of the truck will connect to rear screen support bars on the back of the screen to hold the screen in place.

DETAILED DESCRIPTION OF THE INVENTION

Figure 1:
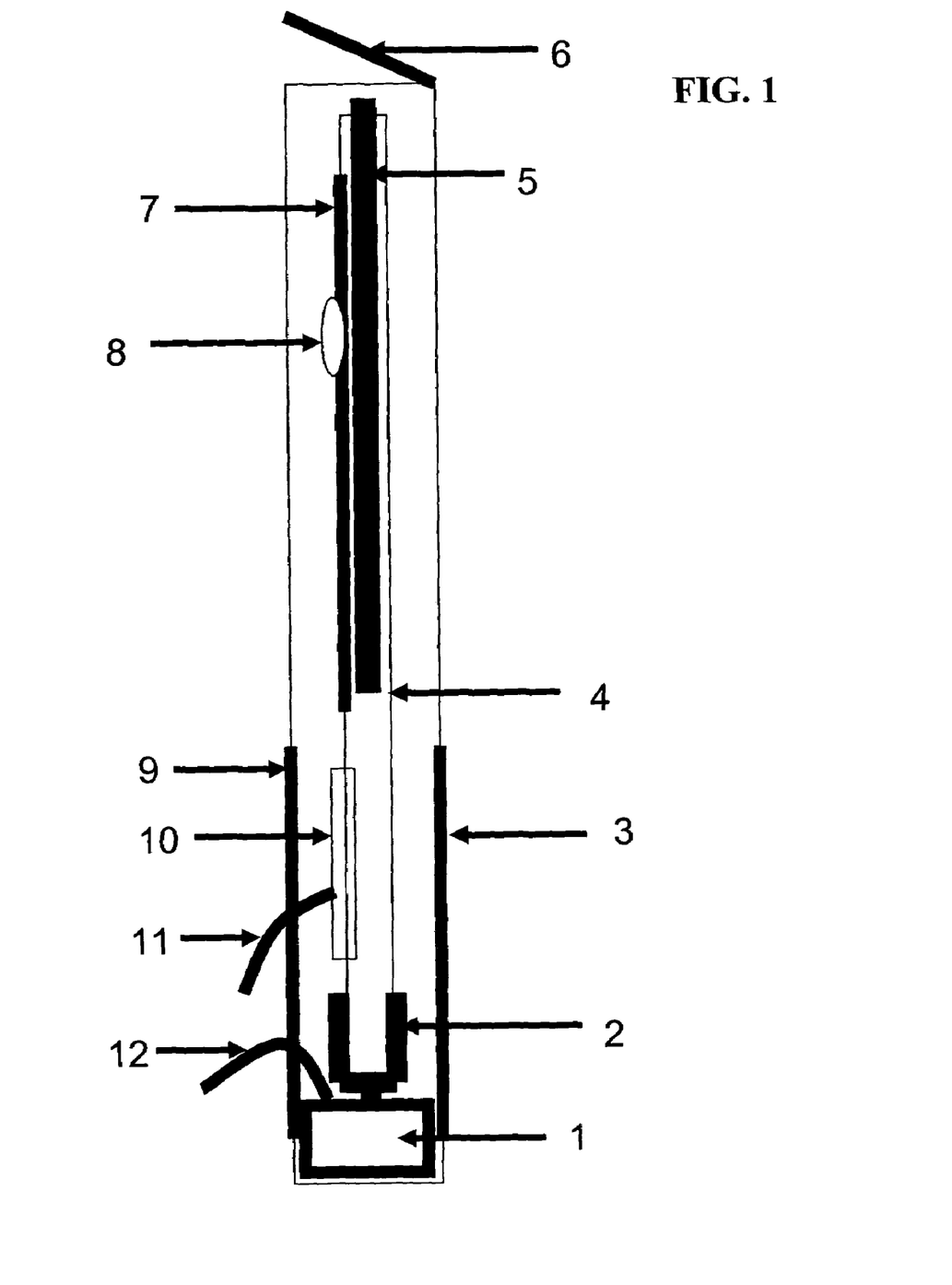
FIG. 1 is a side view of the compartment illustrating the arrangement of the display screen and associated components within the compartment.
Figure 2:
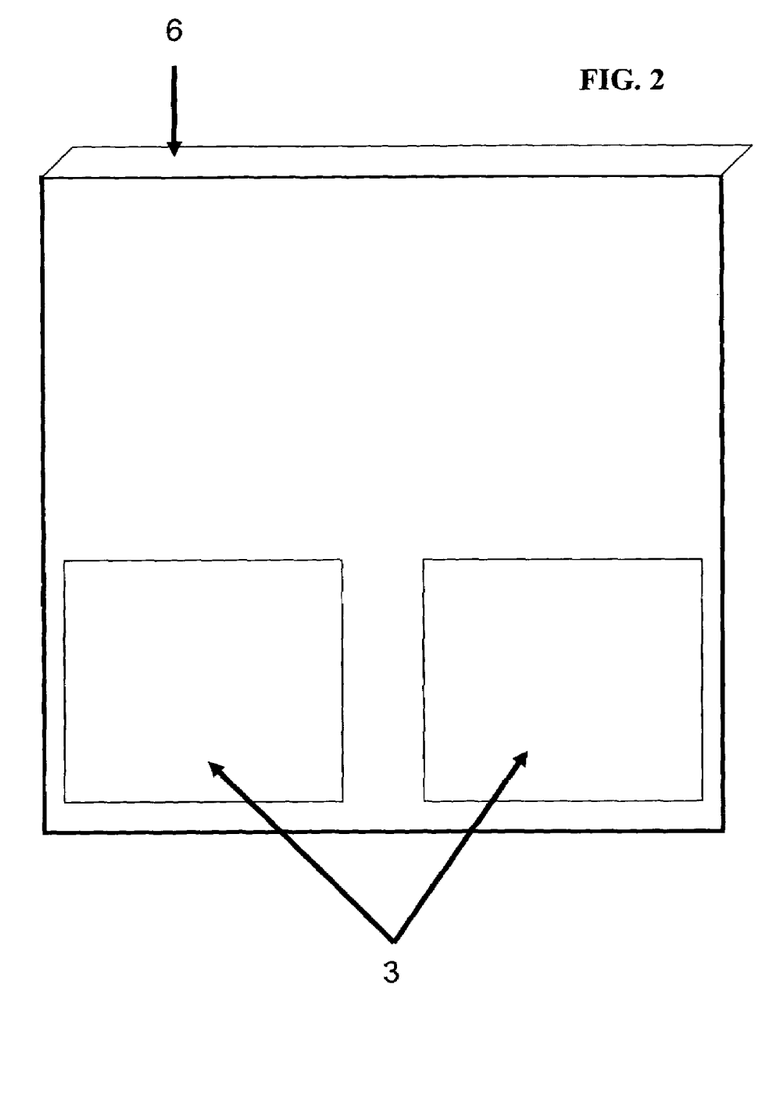
FIG. 2 is a front view of the compartment illustrating the external arrangement of the compartment.
Figure 3:
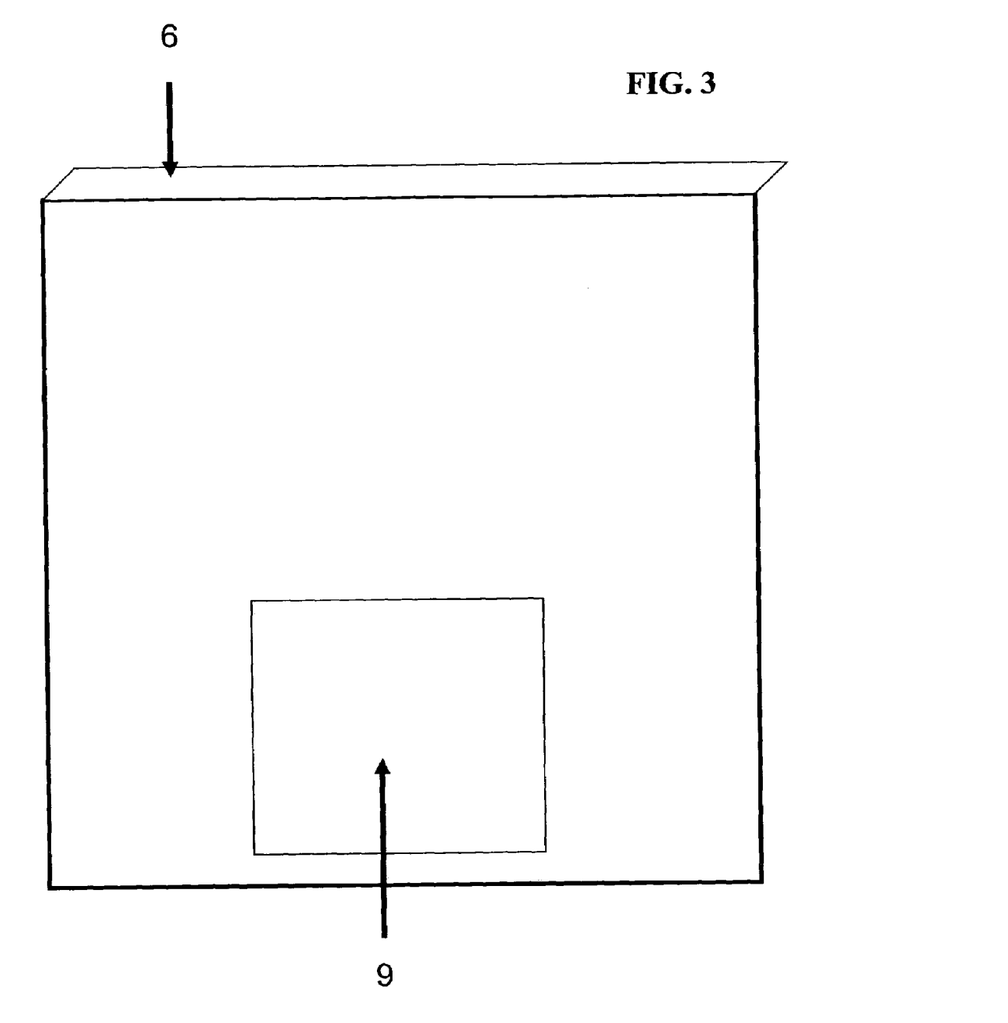
FIG. 3 is a rear view of the compartment illustrating the external arrangement of the compartment.
Figure 6:
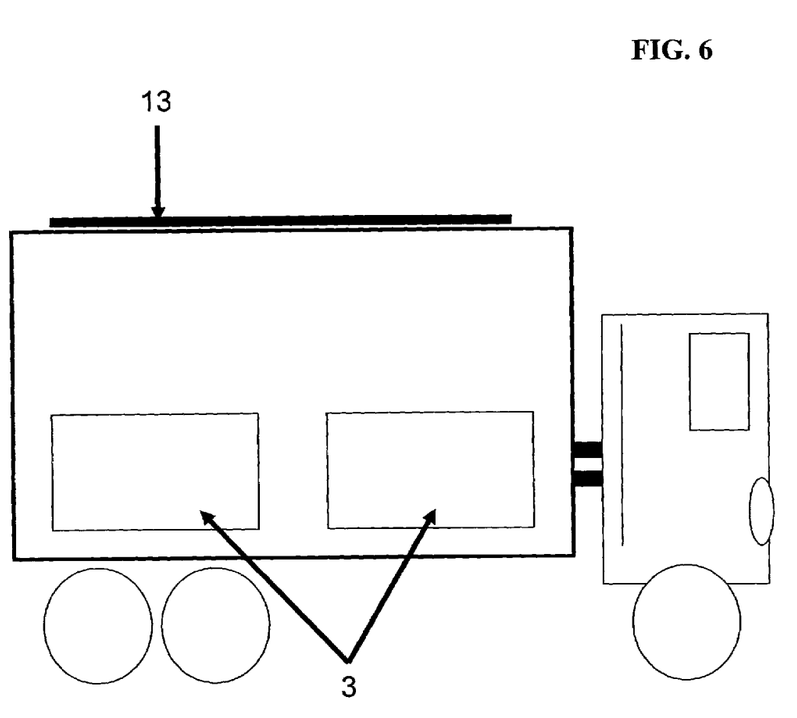
FIG. 6 is a view of a mobile truck illustrating the external arrangement of the mobile screen storage compartment attached one side of the trailer.

The mobile screen storage compartment FIG. 1 stores the display screen 4 with related screen components, hydraulic lift devices 1 and shock support cups 2. The front panel of the screen storage compartment FIG. 6 is removable for access to all components within the compartment. The compartment FIG. 2, FIG. 3 has two doors on the bottom front 3 and one door on the bottom back 9 to access the hydraulic lift devises 1 and the cables and cable connection block 10, 11, 12. The compartment has a top lid FIG. 2, FIG. 3 that opens when the screen is extended and closes when the screen is retracted.

Figure 4:
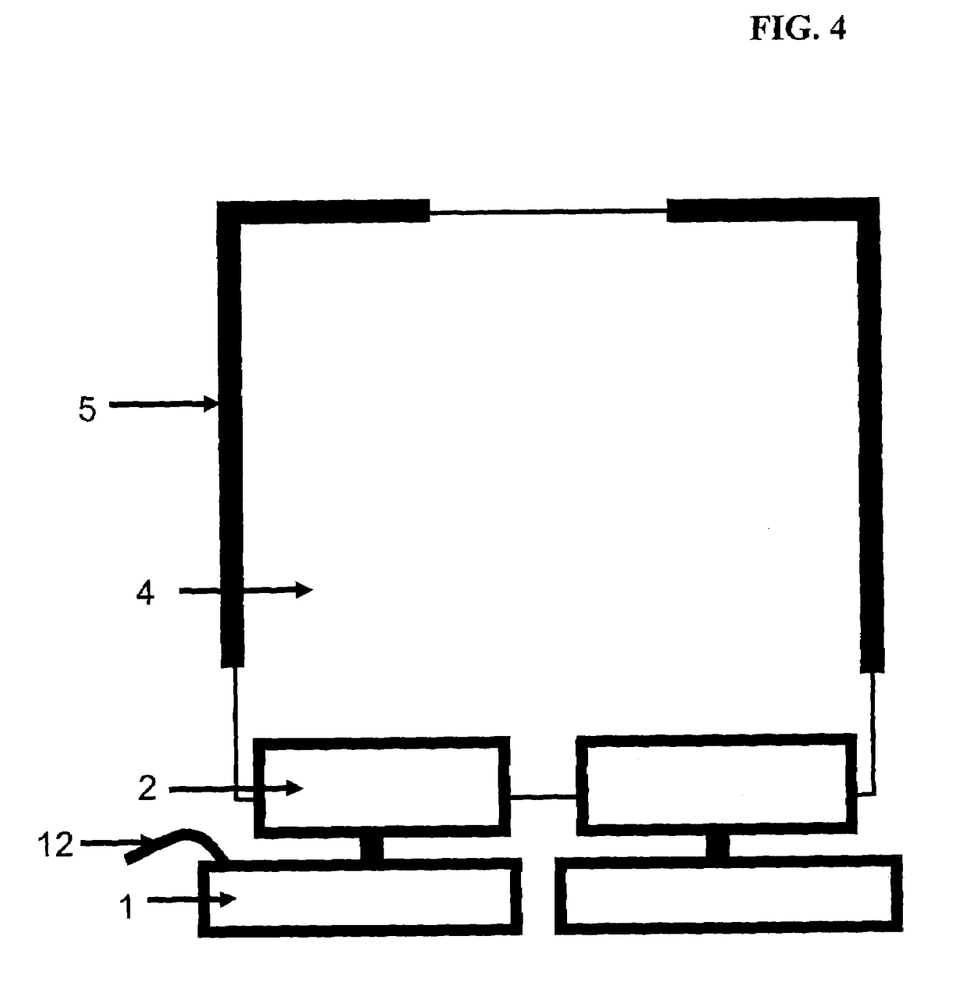
FIG. 4 is a front view of the display screen illustrating the arrangement of the display screen and associated screen components.
Figure 5:
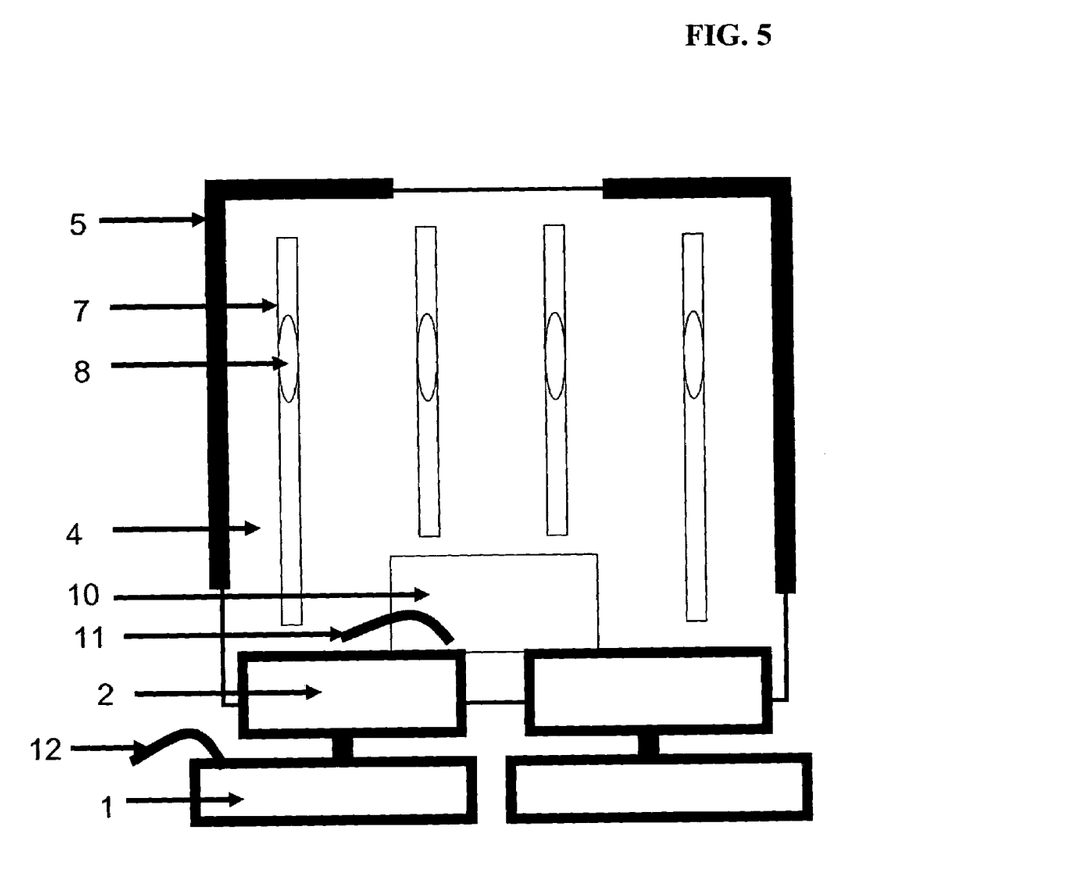
FIG. 5 is a rear view of the display screen illustrating the arrangement of the display screen and associated screen components.

The display screen FIG. 4 rests on top of the hydraulic lift devices 1 and is supported by two shock support cups 2, one on each hydraulic lift 1. The display screen 4 has side frame supports 5 along its top corner edges. The side frame supports 5 hold the screen in place during it's raising and lowering process and keeps screen stable while it is extended FIG. 4. The display screen FIG. 5 has rear support bars 7 arranged vertically along the back. The rear support bars 7 keep the screen stable when it is extended. Each rear screen support bar 7 has a bar pocket 8 that allows the roof support bars 13 to attach and lock into place the display screen 4 once it is extended. The back of the display screen FIG. 5 has a cable connection block 10. The cables 11, 12 run from the inside of the truck through the compartment rear door 10 to the screen storage compartment. The cables 11, 12 attach to the hydraulic lifts 1 and screen cable connection block 10 transferring control, power, audio and video signals and commands.

Figure 7:
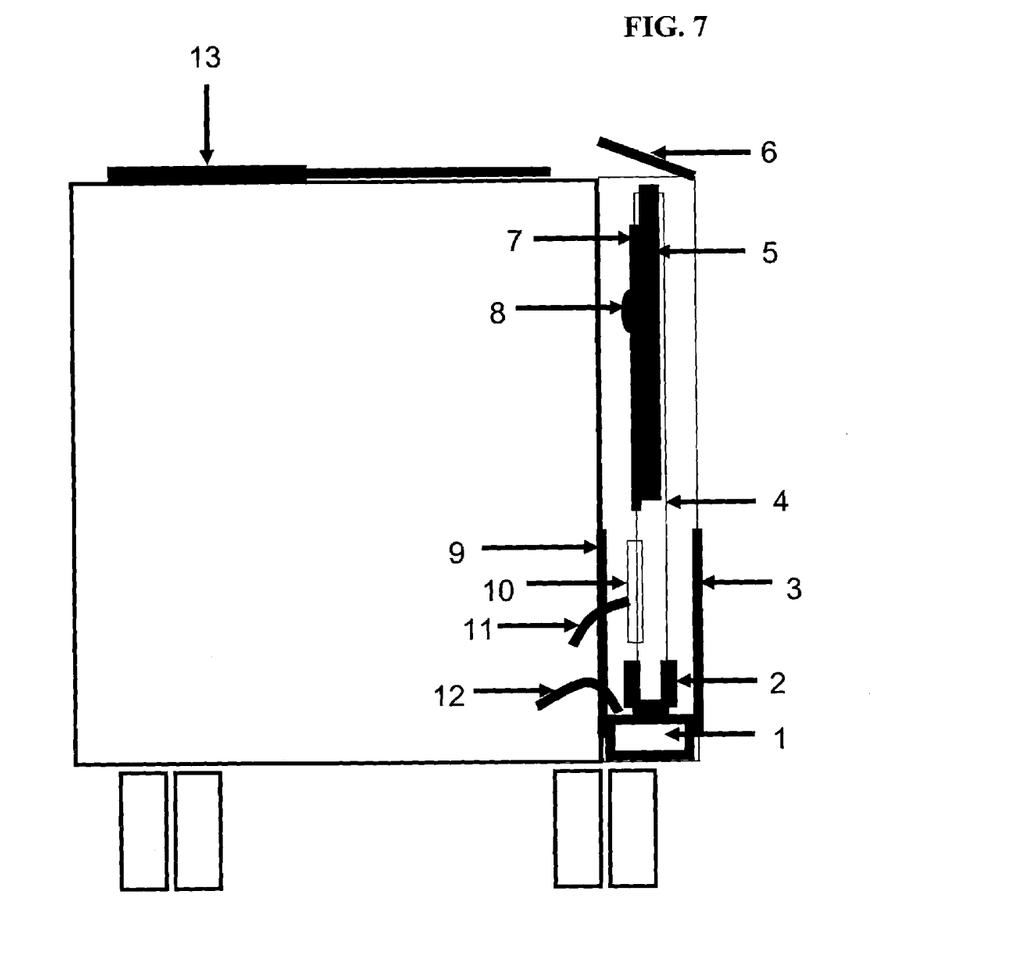
FIG. 7 is a rear view of a truck trailer illustrating the arrangement of the mobile screen storage compartment attached to the trailer.
Figure 8:
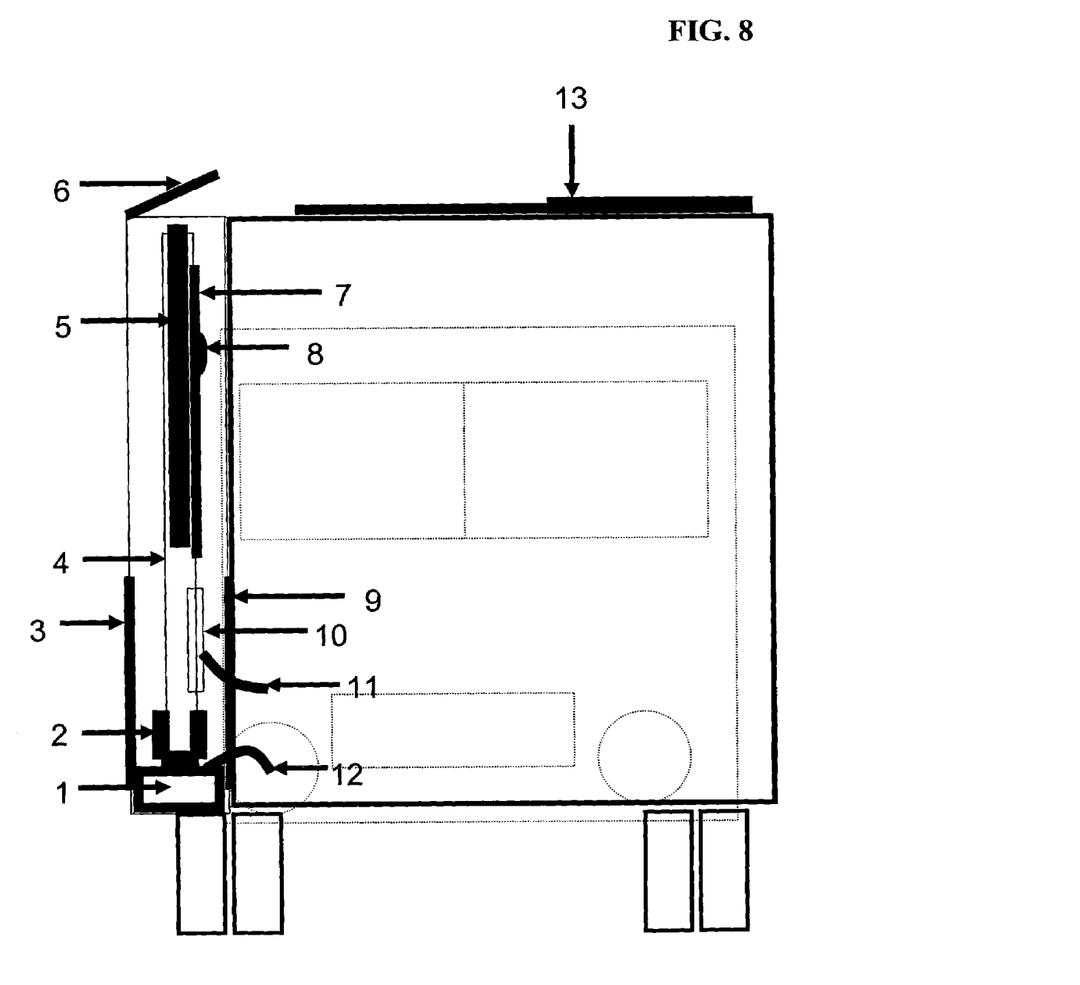
FIG. 8 is a front view of a mobile truck illustrating the arrangement of the mobile screen storage compartment attached to one side of the trailer.
Figure 9:
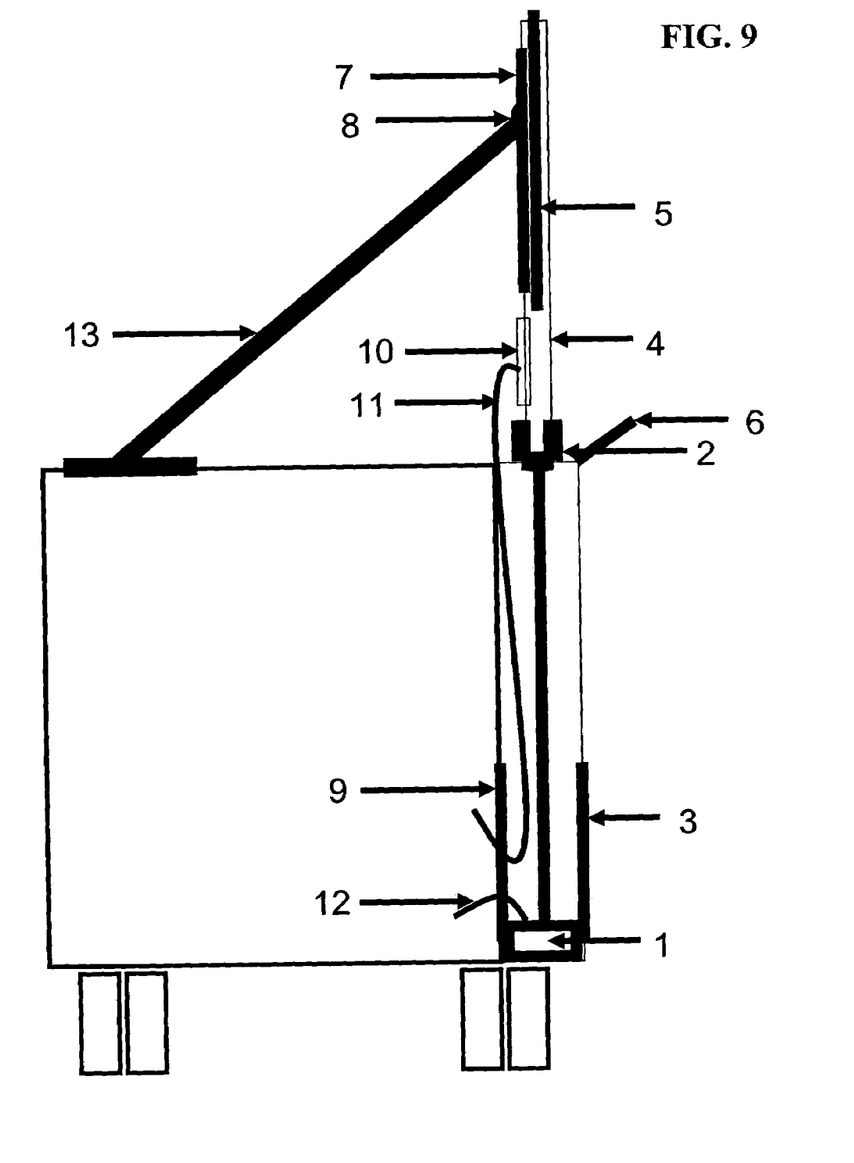
FIG. 9 is a rear view of a truck trailer illustrating the arrangement of the extended display screen from the compartment.
Figure 10:
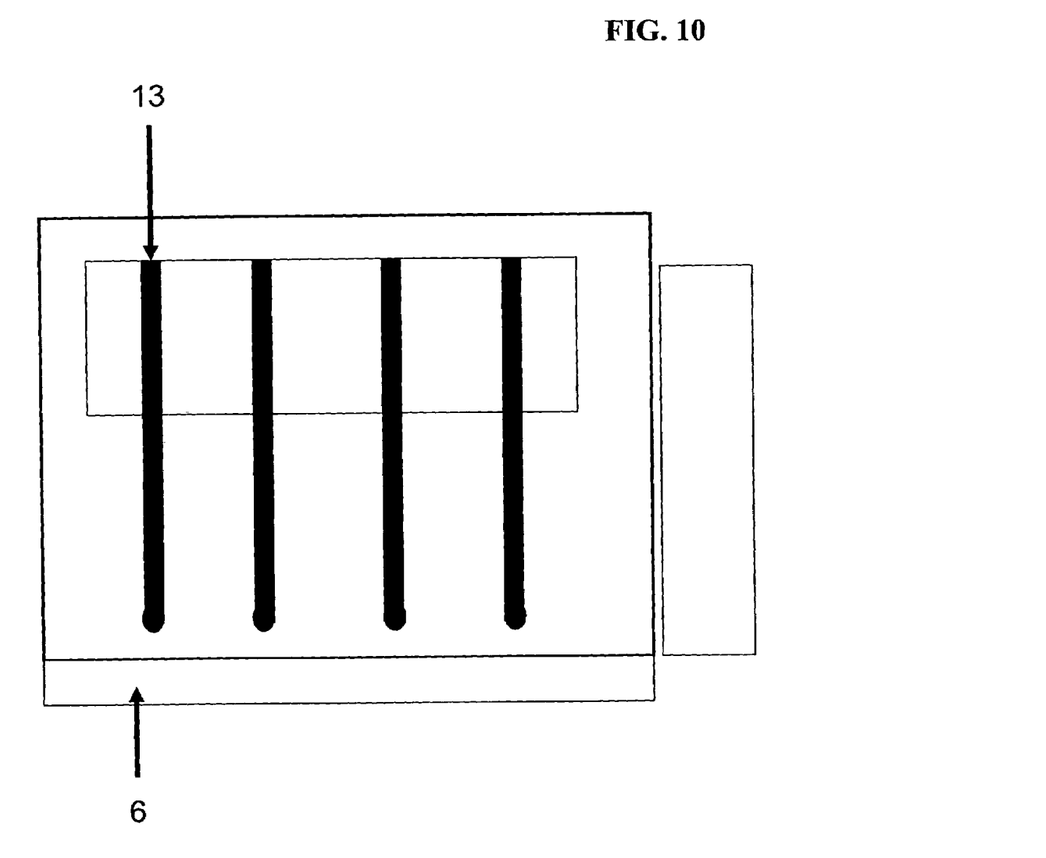
FIG. 10 is a top view of a truck trailer illustrating the arrangement of the display screen roof support bars that stabilize the extended display screen.

The mobile screen storage compartment FIG. 6, FIG. 7, FIG. 8 is attached to one side of a truck trailer and covers the entire surface of that side. The compartment cover lid 6 must be opened before the display screen is extended FIG. 9. The truck roof FIG. 9, FIG. 10 has four screen roof supports 13 that extend at an angle to connect to the rear screen support bars 7 on the back of the display screen 4. The four screen support bars 13 are manually positioned to stabilize the display screen once it is extended FIG. 9. Two hydraulic lifts 1 will raise the screen out of the compartment to a level where the bottom of the screen sits even with the top of the roof edge of the truck FIG. 9.

I claim:

1. A mobile screen storage compartment for storing and displaying a projection screen comprising: a rectangular box and a flat square panel inside of the rectangular box;

said rectangular box has a top lid panel, a bottom base panel, two side panels, a front side panel having two access doors, and a rear side panel having one access door;

said flat square panel has a flat display screen attached to it, frame supports on the top right and left edges of the rear side of said flat square panel, and four support bars on the rear side of said flat square panel;

wherein said flat square panel rests inside two screen support cups; said two screen support cups are connected to hydraulic lift units for lifting the flat square panel out of said rectangular box.

2. The mobile screen storage compartment according to claim 1, wherein said two access doors on said front side panel are positioned near the front side panel's base.

3. The mobile screen storage compartment according to claim 1, wherein said access door on said rear side panel is positioned in the center of said rear side panel near the base of said rear side panel.

4. The mobile screen storage compartment according to claim 1, wherein said top lid panel opens outward and wherein said top lid panel is connected to the rear side panel.

5. The mobile screen storage compartment according to claim 1, wherein said two screen support cups are two hydraulic lift U-shaped screen support cups and a bottom edge of said flat square panel rest within said two hydraulic lift U-shaped screen support cups.

6. The mobile screen storage compartment according to claim 1, wherein said flat square panel has a cable connection block on the back with eight cable connection sockets.

7. The mobile screen storage compartment according to claim 1, wherein the base of each hydraulic lift is comprised of a rectangular box with one power connection socket located on the rectangular box.

8. The mobile screen storage compartment according to claim 1, wherein said four support bars are equally spaced side-by-side and are positioned perpendicular to the bottom edge of said flat square panel.

9. The mobile screen storage compartment according to claim 1, wherein said flat square panel further has frame supports positioned on side edges of said panel.

10. The mobile screen storage compartment according to claim 1, wherein said rectangular box further comprises a set of four beams which are equally spaced side by side and when said flat square panel is lifted out of said rectangular box by the hydraulic lift units, said set of four beams attach and lock into pockets formed in said support bars on the rear side of said flat square panel in order to support said flat square panel.

* * * * *